(12) United States Patent
Rughani

(10) Patent No.: US 7,969,617 B2
(45) Date of Patent: Jun. 28, 2011

(54) MULTILEVEL SCREENING MAPPING TONE VALUES TO CONTROL SIGNAL VALUES FOR GREATER COLOR OR SHADE FIDELITY AND REDUCED PRINT ABERRATIONS

(75) Inventor: Daxa Neykumar Rughani, Hertfordshire (GB)

(73) Assignee: FFEI Limited, Hertfordshire (GB)

( * ) Notice: Subject to any disclaimer, the term of this patent is extended or adjusted under 35 U.S.C. 154(b) by 591 days.

(21) Appl. No.: 12/133,186

(22) Filed: Jun. 4, 2008

(65) Prior Publication Data

US 2009/0046118 A1    Feb. 19, 2009

(30) Foreign Application Priority Data

Jun. 12, 2007  (GB) .................................. 0711341.8

(51) Int. Cl.
| | |
|---|---|
| *H04N 1/405* | (2006.01) |
| *H04N 1/409* | (2006.01) |
| *B41J 2/205* | (2006.01) |
| *H04N 1/52* | (2006.01) |
| *H04N 1/58* | (2006.01) |

(52) U.S. Cl. ...................... 358/3.13; 358/3.14; 358/3.22; 358/3.23; 358/502; 358/504; 358/536; 347/14; 347/15; 347/19

(58) Field of Classification Search .................. 358/1.9, 358/3.06, 3.13, 3.14, 3.21, 3.22, 3.23, 3.26, 358/502, 504, 534–536, 406, 465, 466; 347/10–15, 347/19, 40, 42, 43

See application file for complete search history.

(56) References Cited

U.S. PATENT DOCUMENTS

| | | | |
|---|---|---|---|
| 6,386,668 B1 * | 5/2002 | Shimizu et al. ................. | 347/13 |
| 7,012,717 B1 | 3/2006 | Easwar | |
| 7,290,845 B2 * | 11/2007 | Tanaka ............................ | 347/15 |
| 2003/0128395 A1 | 7/2003 | Sharma et al. | |
| 2005/0041833 A1 | 2/2005 | Bhattacharjya | |
| 2005/0270583 A1 | 12/2005 | Velde | |

FOREIGN PATENT DOCUMENTS

| | | |
|---|---|---|
| EP | 0454448 A2 | 10/1991 |
| EP | 0741486 A1 | 11/1996 |
| EP | 0889639 A1 | 1/1999 |
| EP | 1120958 A2 | 8/2001 |
| EP | 1722549 A1 | 11/2006 |
| GB | 2094095 A | 9/1982 |

* cited by examiner

*Primary Examiner* — Scott A Rogers
(74) *Attorney, Agent, or Firm* — Kenyon & Kenyon LLP

(57) ABSTRACT

A method of producing a printed output on a substrate is provided using a drop emitting device which is adapted to emit a plurality of ink quantities in response to a control signal. The method comprises the steps of receiving image data corresponding to a pixel of an image to be printed, the received image data comprising a tone value; generating a threshold value for use in a screening operation based on the location of the pixel within the image to be printed; mapping the received tone value to a mapped tone value using a first tone mapping, the mapped tone value being generated based on the received tone value; performing the screening operation by comparing the mapped tone value with the threshold value; mapping the received tone value to a control signal value using a first control mapping if the output of the comparison performed in the previous step indicates a first relationship, the control signal value being generated based on the received tone value; and repeating the previous three steps if the output of the comparison performed in the previous step indicates a second relationship, wherein the first mapping step comprises using an alternate tone mapping and the second mapping step comprises using an alternate control mapping.

27 Claims, 14 Drawing Sheets

Fig. 5.

| i \ $C_r$ | 0-127 | 128-255 | 256-382 | 384-511 | 512-639 | 640-767 | 768-895 | 896-1023 |
|---|---|---|---|---|---|---|---|---|
| 0 | $F_1(C_r)$ | $F_1(C_r)$ | $F_1(C_r)$ | $F_1(C_r)$ | $F_1(C_r)$ | $F_1(C_r)$ | $F_1(C_r)$ | $F_1(C_r)$ |
| 1 | $F_2(C_r)$ | $F_2(C_r)$ | $F_2(C_r)$ | $F_2(C_r)$ | $F_2(C_r)$ | $F_2(C_r)$ | $F_2(C_r)$ | $F_2(C_r)$ |
| 2 | $F_3(C_r)$ | $F_3(C_r)$ | $F_3(C_r)$ | $F_3(C_r)$ | $F_3(C_r)$ | $F_3(C_r)$ | $F_3(C_r)$ | $F_3(C_r)$ |

Fig. 6.

| i \ $C_r$ | 0-127 | 128-255 | 256-382 | 384-511 | 512-639 | 640-767 | 768-895 | 896-1023 |
|---|---|---|---|---|---|---|---|---|
| 0 | $F_1(C_r)$ | $F_1(C_r)$ | $F_1(C_r)$ | $F_1(C_r)$ | $F_1(C_r)$ | $F_1(C_r)$ | $F_1(C_r)$ | $F_1(C_r)$ |
| 1 | $F_2(C_r)$ | $F_2(C_r)$ | $F_2(C_r)$ | $F_2(C_r)$ | $F_2(C_r)$ | $F_2(C_r)$ | $F_2(C_r)$ | $F_2(C_r)$ |
| 2 | $F_3(C_r)$ | $F_3(C_r)$ | $F_3(C_r)$ | $F_3(C_r)$ | $F_3(C_r)$ | $F_3(C_r)$ | $F_3(C_r)$ | $F_3(C_r)$ |
| 3 | $F_4(C_r)$ | $F_4(C_r)$ | $F_4(C_r)$ | $F_4(C_r)$ | $F_4(C_r)$ | $F_4(C_r)$ | $F_4(C_r)$ | $F_4(C_r)$ |
| 4 | $F_5(C_r)$ | $F_5(C_r)$ | $F_5(C_r)$ | $F_5(C_r)$ | $F_5(C_r)$ | $F_5(C_r)$ | $F_5(C_r)$ | $F_5(C_r)$ |

| i\$C_r$ | 0-127 | 128-255 | 256-382 | 384-511 | 512-639 | 640-767 | 768-895 | 896-1023 |
|---|---|---|---|---|---|---|---|---|
| 0 | 7 | 6 | 5 | 4 | 3 | 2 | 1 | 0 |
| 1 | 6 | 5 | 4 | 3 | 2 | 1 | 0 | 0 |
| 2 | 5 | 4 | 3 | 2 | 1 | 0 | 0 | 0 |

Fig. 7.

| i\$C_r$ | 0-127 | 128-255 | 256-382 | 384-511 | 512-639 | 640-767 | 768-895 | 896-1023 |
|---|---|---|---|---|---|---|---|---|
| 0 | 7 | 6 | 5 | 4 | 3 | 2 | 1 | 0 |
| 1 | 6 | 5 | 4 | 3 | 2 | 1 | 0 | 0 |
| 2 | 5 | 4 | 3 | 2 | 1 | 0 | 0 | 0 |
| 3 | 3 | 3 | 2 | 1 | 0 | 0 | 0 | 0 |
| 4 | 2 | 2 | 1 | 0 | 0 | 0 | 0 | 0 |

Fig. 8.

One Drop Per Band Calibration Chart

100% DPP 1
100% DPP 2
100% DPP 3
100% DPP 4
100% DPP 5
100% DPP 6
100% DPP 7

Five Drop Per Band Calibration Target

20% DPP 1
20% DPP 1,2
20% DPP 1,2,3
20% DPP 1,2,3,4
20% DPP 1,2,3,4,5
20% DPP 2,3,4,5,6 — 1710
20% DPP 3,4,5,6,7
20% DPP 4,5,6,7,7
20% DPP 5,6,7,7,7
20% DPP 6,7,7,7,7
100% DPP 7

MULTILEVEL SCREENING MAPPING TONE VALUES TO CONTROL SIGNAL VALUES FOR GREATER COLOR OR SHADE FIDELITY AND REDUCED PRINT ABERRATIONS

FIELD OF THE INVENTION

The present invention relates to a method and system for use in producing a printed output on a substrate using a printing device. In particular the present invention relates to a method and a system for use in generating control signals for a drop emitting device from received image data.

BACKGROUND OF THE INVENTION

An inkjet printing system typically comprises an image source and inkjet printhead. Such a system is designed to print a specific output on a substrate. The inkjet printhead typically further comprises a plurality of drop emitting devices, each drop emitting device being configured to emit a quantity of ink onto the substrate below. In a colour printing system a plurality of inkjet printheads are used, wherein each inkjet printhead is adapted to print a different colour component of the complete colour image.

Typically, an image source provides image data in the form of a two-dimensional image file. When an image is to be printed, print drivers upon the image source and control systems upon the inkjet printing device convert the image data into a series of control signals which are used to actuate the drop emitting devices. In a typical colour printing system, image data is first converted into four colour components: each component being one of cyan, magenta, yellow and black (CMYK). The printing system then comprises four sets of drop emitting devices, one on each of a plurality of inkjet printheads, wherein each device is adapted to print a different colour component. In most printing systems, each drop emitting device will be a binary device configured either to print a drop of ink upon receipt of a positive signal or not to print the drop of ink on receipt of a null signal. Hence the image data, which is typically within a colour space, such as RGB or CIE L*a*b* colour space, must be converted into a binary control signal with which to control each drop emitting device.

This conversion process is further complicated by the process of screening. As stated previously, an image is typically decomposed into four colour component images, one for each of the CMYK components. Each of these CMYK images is then printed by a separate set of drop emitting devices. By printing each component on top of each other, a colour image is produced. However, it is difficult to represent different shades of colour with this system, as the amount of ink emitted by each drop emitting device is limited and as such the printing process cannot vary the amount of ink applied to the substrate. Screening solves this problem by representing lighter shades as a series of dots or patterns rather than solid areas of ink. By configuring the screening pattern, a variety of shades can be produced which appear to the eye to form a continuous colour image.

A prior art system for applying a screening process is shown in FIG. 11. The screening operation is performed pixel by pixel, as each pixel of image data is typically printed by a single drop emitting device. The prior art binary screening system 1100 comprises a threshold array 1130. The threshold array 1130 is typically a two-dimensional array that contains data configured so as to generate a screening pattern on the substrate. The system 1100 receives a pixel 1110 of image data and also receives the pixel's X 1160 and Y 1170 position within an image to be printed. The X 1160 and Y 1170 positional information provides a set of indices with which to retrieve a threshold value T from the two-dimensional threshold array 1130. The system 1100 also extracts a colour tone value $C_r$ from the image data. This colour tone value $C_r$ is typically the intensity level of a particular colour component. The colour tone value $C_r$ is then compared with the threshold value T using a binary comparator 1140. The output of the binary comparator 1140 is a control signal CS which is used to control the drop emitting device 1150.

For example, if the colour tone value $C_r$ is greater than the threshold value T, the comparator 1140 will output a control signal CS with a value of one. This will instruct the drop emitting device 1150 to print a drop of ink. If the colour tone value $C_r$ is less than the threshold value T, then the comparator 1140 will output a control signal CS with a value of zero which will instruct the drop emitting device 1150 not to print a drop of ink. By repeating this process for each pixel in a given scan line, and then repeating for the number of scan lines within the final image, a suitable screening pattern can be printed on the substrate. As the X 1160 and Y 1170 positional data for each pixel will vary, a number of different threshold values will be generated. It is this variation that allows a screening pattern to be printed.

The method of printing an output using the system of FIG. 11 is illustrated in FIG. 1. At step 110 image data $I_r$ is received. This image data $I_r$ is converted to a control signal value CS by the system of FIG. 11 in step 120. The control signal is then sent to a drop emitting device in step 130 and the drop emitting device prints an output onto the substrate at step 140. At step 150, the printing system 1100 checks whether more image data remains: if there are remaining pixels then the printing system 1100 retrieves the next pixel at step 160 and the process begins again. If there are no more remaining pixels then the process ends at step 170.

In recent times, inkjet printing devices have been invented that can emit a plurality of ink quantities. For example, these inkjet printing devices may comprise adapted drop emitting devices that are able to emit two or more drops for a given pixel or pixel colour component value. These devices enable printed images with greater shade fidelity to be generated. However, the use of these devices also generates two additional problems. The first of these is how to adapt the binary screening system such as that shown in FIG. 11 which is designed for binary drop emitting devices. The second of these is how to reduce the appearance of undesirable print artefacts that have been created because a range of ink quantities can now be printed. These undesirable print artefacts arise due to the larger range of the adapted drop emitting devices, which means it becomes possible to print a reduced quantity of ink upon the substrate when compared to a binary drop emitting devices. This then becomes a problem when the resolution of the printing system in a direction perpendicular to the feed direction of a substrate is fixed by the number of drop emitting devices that form the inkjet printhead.

For example, an inkjet printhead may comprise a row of drop emitting devices that extends laterally in a direction perpendicular to the feed direction of a substrate. Using the latest technology this row may contain approximately 140 drop emitting devices per centimeter, fixing the resolution at 360 dots per square inch. At this resolution a binary drop emitting device is able to emit enough ink to cover a corresponding pixel area on the substrate below. However, if adapted drop emitting devices are used that can emit a reduced quantity of ink, then it is possible that the emitted ink will not cover the corresponding pixel area on the substrate below. In this case a viewer of the printed image may be aware of an area of unprinted substrate around the reduced quantity of ink present on the substrate. If two neighbouring adapted drop emitting devices emit a reduced quantity of ink then the problem is further compounded as this action produces an even larger area of unprinted substrate and can produce a "speckling" or "streaking" effect visible to a viewer. One such example is what is referred to as "rain". This is where a series of vertical lines or streaks are visible on a printed image because a group of neighbouring adapted drop emitting devices have repeatedly been instructed to print reduced ink quantities.

SUMMARY OF THE INVENTION

In accordance with a first aspect of the present invention there is provided a method of producing a printed output on a substrate using a drop emitting device adapted to emit a plurality of ink quantities in response to a control signal, the method comprising the steps of:
  a. receiving image data corresponding to a pixel of an image to be printed, the received image data comprising a tone value;
  b. generating a threshold value for use in a screening operation based on the location of the pixel within the image to be printed;
  c. mapping the received tone value to a mapped tone value using a first tone mapping, the mapped tone value being generated based on the received tone value;
  d. performing the screening operation by comparing the mapped tone value with the threshold value;
  e. mapping the received tone value to a control signal value using a first control mapping if the output of the comparison performed in previous step (d) indicates a first relationship, the control signal value being generated based on the received tone value; and
  f. repeating steps (c) to (f) if the output of the comparison performed in previous step (d) indicates a second relationship, wherein step (c) comprises using an alternate tone mapping and step (e) comprises using an alternate control mapping.

By using a tone mapping and a control mapping a control signal value can be selected from a group control signal values based on a screening operation. This provides greater variation in the printed output and reduces the appearance of visible print aberrations. By using the output of a screening operation to decide whether to iterate the method steps conventional screening systems can be integrated with multilevel drop emitting devices. This results in a high quality printed image with a greater colour or shade fidelity.

By mapping the received tone value to a mapped tone value, the method is able to use standard binary thresholding processes without change. The repetition of the last four steps if the output of the comparison indicates a second relationship allows a control signal value to be selected from a group of possible control signal values based on the number of repetitions. Furthermore, the selection of the control signal value based on the above method may control the number of drops of ink emitted from the drop emitting device. The control signal value may also be inversely proportional to the number of iterations of the last four steps that have been performed. Hence the quantity of ink emitted by the drop emitting device will reduce as more iterations are performed. This then further allows steps common to standard binary thresholding methods to be used with an adapted drop emitting device capable of emitting a plurality of quantities of ink.

The tone mapping and control mapping used on each iteration of the above method will typically use a different mapping strategy. This may then produce a different mapped tone value and possibly a different control signal value for each iteration. By varying the mapping method rather than the method steps standard to binary screening, the method can easily apply a binary screening method to a multi-level system and furthermore is able to reduce the appearance of print aberrations by varying the control signal value.

In certain embodiments using one of the tone mappings corresponding look-up table, each tone look-up table being indexed by the received tone value. Using one of the tone mappings may also comprise using a two-dimensional array that uses the received tone value and the number of repetitions of steps (c) to (f) as indices. Using a control mapping may also further comprise using a corresponding look-up table or using a two-dimensional array. Using a plurality of look-up tables to provide the mapping provides a quick and simple solution to a problem of how to produce a mapped tone value and a control signal value. Using a two-dimensional array further enhances these advantages.

In a preferred embodiment of the present invention, the method further comprises setting an iteration counter to an initial value before performing the mapping between the received tone value and the mapped tone value and the screening operation further comprises, if the output of the comparison indicates a second relationship, incrementing the iteration counter. Each mapping operation can also comprise looking up a mapped output in a two dimensional array using the received tone value and the iteration counter as indices. The use of an iteration counter and the received tone value as indices allow a value to be quickly retrieved from either one of the above two-dimensional arrays. The use of an iteration counter may also allow the control signal value to be inversely proportional to the number of iterations of the screening operation, however this will depend upon the contents of the look-up tables or two-dimensional arrays.

In accordance with a second aspect of the present invention there is provided a method of producing a printed output on a substrate using a drop emitting device adapted to emit a plurality of ink quantities in response to a control signal, the method comprising the steps of:
a. receiving image data corresponding to a pixel of an image to be printed, the received image data comprising a tone value;
b. generating a threshold value for use in a screening operation based on the location of the pixel within the image to be printed;
c. mapping the received tone value to a plurality of mapped tone values using a corresponding plurality of tone mappings, the plurality of mapped tone values being generated based on the received tone value;
d. performing the screening operation by comparing each of the plurality of mapped tone values with the threshold value; and
e. mapping the received tone value to a control signal value using a control mapping, the control mapping being selected from a plurality of control mappings based on the output of step (d), the control signal value being generated based on the received tone value.

This method provides an alternative set of steps wherein, instead of iterating the screening operation, the various steps of the screening operation are performed in parallel, i.e. producing a plurality of mapped tone values and performing a parallel comparison of the threshold value and the plurality of mapped tone values. In certain situations this can provide a faster method but its implementation depends on the hardware and/or software available.

In a preferred embodiment, the control mapping comprises selecting a control signal value from a group of two or more control signal values representative of two or more ink quantities. By using an increased number of control signal values, the tone fidelity can be increased and the appearance of print aberrations reduced. This group may be a non sequential group and may comprise any combination of ink quantity levels.

In certain embodiments, the method further comprises: measuring the characteristics of a test printed output; generating a measured dot gain characteristic curve based on the measured characteristics; and calibrating one or more tone mappings and/or one or more control mappings so as to minimise the difference between the measured dot gain characteristic curve and a reference dot gain characteristic curve. These calibration steps then correct for any alterations from a reference dot gain characteristic curve that may be introduced by the screening operation or the method of the first aspect of the present invention.

The method may also comprise configuring one or more tone mappings and/or one or more control mappings so as to limit the maximum quantity of ink emitted from the drop emitting device or to vary the dot percentage range for a plurality of tone values. This may be required when using a variety of substrates as each substrate may only be able to hold a set quantity of ink.

According to a third aspect of the invention there is provided a system for producing a printed output upon a substrate the system comprising: a drop emitting device for emitting a plurality of ink quantities in response to a control signal; an image receiver for receiving image data corresponding to a pixel of an image to be printed, the received image data comprising a tone value; a threshold generator for producing a threshold value for use in a screening operation; a mapping generator for generating a mapped tone value based on one of a plurality of tone mappings, each tone mapping operating on the received tone value; a comparator for performing a screening operation, wherein the comparator is adapted to compare the mapped tone value with the threshold value; and a controller for processing the comparator output and generating a control signal value based on one of a plurality of control mappings, each control mapping operating on the received tone value, wherein: if the output of the comparator indicates a first relationship, the controller is adapted to select one of the plurality of control mappings to generate control signal value; if the output of the comparator indicates a second relationship the controller is further adapted to instruct the mapping generator to produce a mapping tone value using an alternate one of the plurality of tone mappings and to select an alternate one of the plurality of control mappings with which to generate control signal value.

The third aspect of the present invention then provides a series of technical integers to implement the method of the first aspect of the present invention. The second aspect is then able to provide the advantages previously discussed.

In a preferred embodiment of the present invention the mapping generator comprises a first two-dimensional mapping array for providing a mapped tone value based on the received tone value and an iteration counter; the threshold generator comprises a second two-dimensional threshold array for providing a threshold value based on the location of the pixel within the image to be printed; the controller comprises a third two-dimensional control array for generating a control signal value based on the received tone value and the iteration counter; and the controller is further adapted to perform the following steps in response to receiving a tone value: generating a threshold value using the second two-dimensional threshold array; resetting the iteration counter; generating a mapped tone value using the first two dimensional mapping array; and generating an output using the comparator, wherein, if the output of the comparison indicates a first relationship, the controller is adapted to generate a control signal value using the third two-dimensional control array, and, if the output of the comparison indicates a second relationship, the controller is adapted to increment the iteration counter and repeat steps (iii) and (iv).

The use of three two-dimensional arrays allow an efficient solution to the mapping of a tone value to a mapped tone value and the problem of generating a control signal value based on received tone value. These three two-dimensional arrays can be implemented either in software or in hardware. The controller is then adapted to route signals between various components and to control the sequence of the screening operation. In certain embodiments of the present invention, the mapping array and the comparator are adapted to produce a plurality of outputs. The controller can then perform its control of the system in parallel. This can speed up the operation of the system.

In certain embodiments, the size of each of the first and third two-dimensional arrays in one dimension is determined by the maximum number of ink quantities that can be emitted by the drop-emitting device. In certain embodiments the control signal value is selected from a group of two or more control signal values representative of two or more ink quantities based on a screening operation. This group may also be non-sequential. The drop-emitting device may be adapted to output zero or more drops of ink based on the three or more control signal values.

In other embodiments, the system further comprises a sensor for measuring a printed output upon a substrate, the printed output comprising a test pattern; and a calibration module for calibrating one or more tone mappings and/or one or more control mappings based on one or more measurements received from the sensor. The calibration module may be adapted to generate a measured dot gain characteristic curve based on the one or more measurements received from the sensor and to calibrate the one or more tone mappings and/or one or more control mappings based on a comparison of the measured dot gain characteristic curve and a reference dot gain characteristic curve.

The calibration module then allows the screening operation to be calibrated, based on actual printed output and also allows the mapping operation to be configured so as to produce tonal characteristics that are preferred by the human eye. The mapping generator and controller may also be adapted to configure the control signal so as to limit the maximum quantity of ink emitted from the drop emitting device or the screening system may be adapted to configure the control system based on the type of substrate to be printed upon. The dot percentage range for a group of tone values may also be changed along the range of tone values by adapting the mapping generator.

According to a fourth aspect of the present invention there is provided a colour printing apparatus for producing a coloured printed output on a substrate, the printing apparatus comprising a plurality of systems according to the third aspect of the present invention, wherein each system is adapted to produce a printed output of a different colour component on the substrate. Hence, a plurality of systems according to the third aspect of the present invention can be used to implement a CMYK printing system.

BRIEF DESCRIPTION OF THE DRAWINGS

Some examples of methods and systems for providing multilevel screening in accordance with the present invention will now be described with reference to the accompanying drawings in which:—

FIG. 5 is a first example of a two-dimensional mapping array for use with the second and third embodiments of the present invention;

FIG. 6 is a second example of a two-dimensional mapping array for use with the second and third embodiments of the present invention;

FIG. 7 is a first example of a two-dimensional control array for use with the second and third embodiments of the present invention;

FIG. 8 is a second example of a two-dimensional control array for use with the second and third embodiments of the present invention;

DETAILED DESCRIPTION OF EMBODIMENTS

Figure 2:
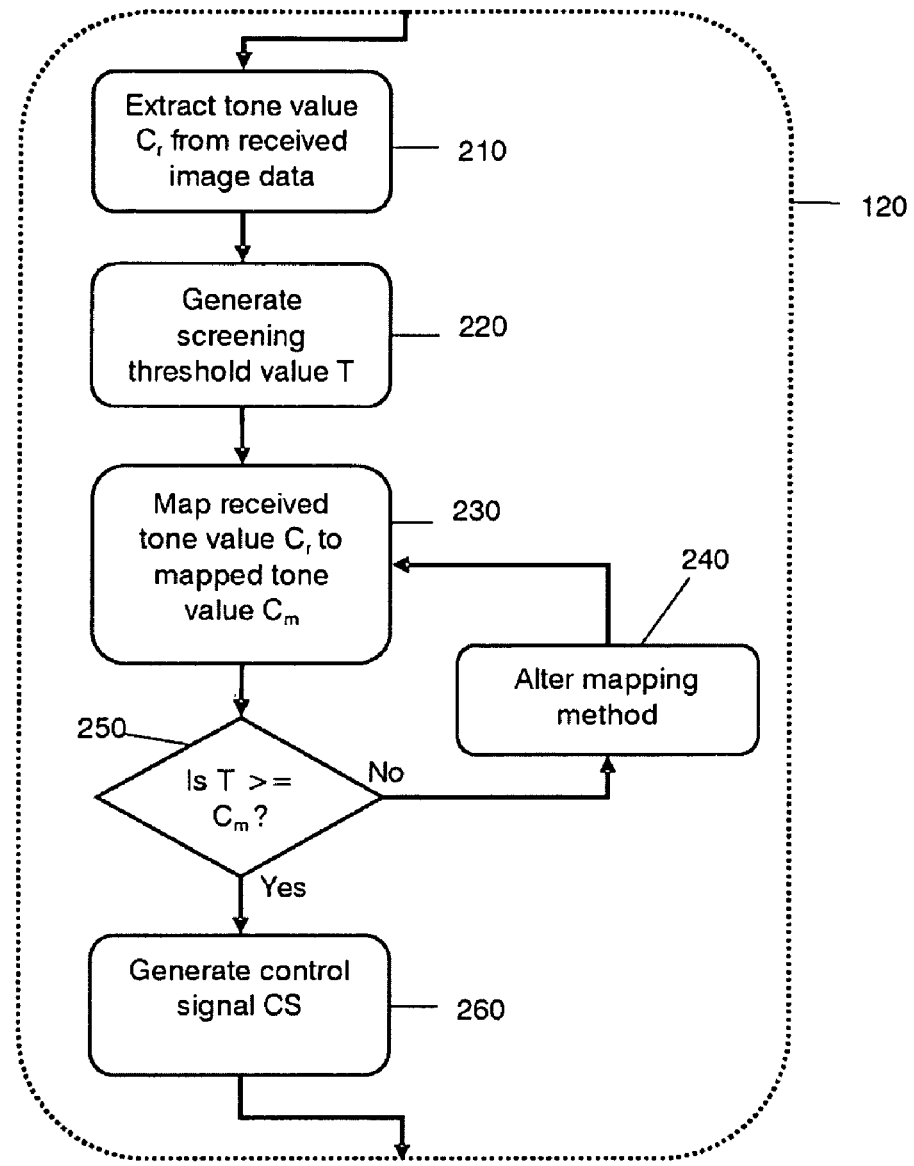
FIG. 2 is a flow chart showing an example set of method steps according to a first embodiment of the present invention.
Figure 11:
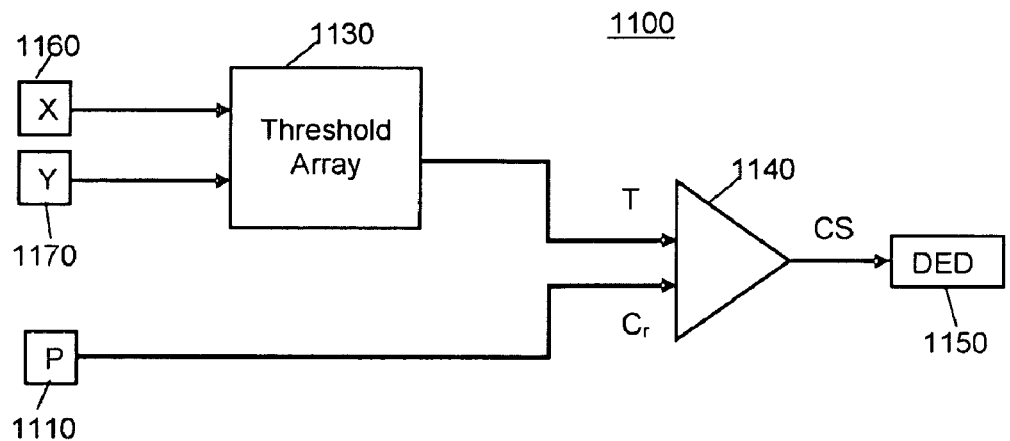
FIG. 11 is an example of a binary screening system as can be found in the prior art.
Figure 12:
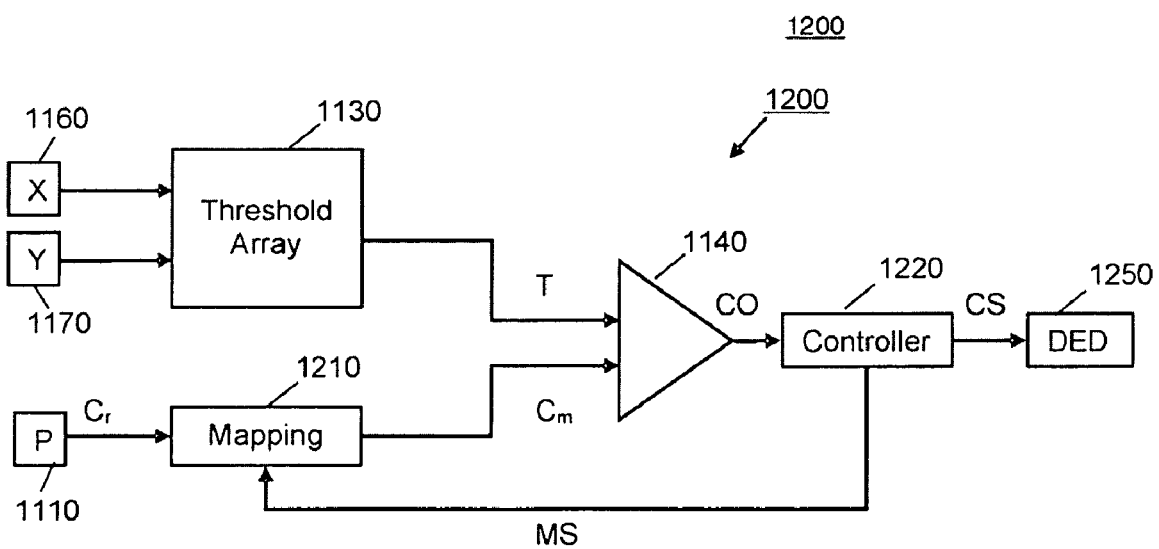
FIG. 12 is an example of a multilevel screening system according to a first embodiment of the present invention.

A first embodiment of the present invention is illustrated in FIGS. 2 and 12. FIG. 12 illustrates a printing system 1200 for applying multilevel screening. The printing system 1200 shares certain components with the prior art binary screening system shown in FIG. 11. These include threshold array 1130, comparator 1140, pixel location generators 1160 and 1170 and pixel receiving means 1110. In addition to the components shared with the binary screening system the printing system 1200 further comprises a mapping generator 1210 and a controller 1220. The printing system of FIG. 12 also includes a drop emitting device 1250 that differs from the device 1150 shown in FIG. 11. The printing system 1200 can by a combination of software and hardware components.

Drop emitting device 1250 differs from drop emitting device 1150 in that it is able to emit a plurality of ink quantities in response to a control signal CS sent from a controller 1220. For example, the drop emitting device 1250 may comprise a piezoelectric actuator adapted to control the device to emit between zero and seven drops of ink per pixel. In this case, the control signal CS will be a three bit data value coding for a respective number of drops. The drop emitting device 1250 is then adapted to receive the control signal CS and operate the piezoelectric actuator accordingly.

The mapping generator 1210 is operably connected to pixel receiving means 1110, controller 1220 and comparator 1140. The mapping generator 1210 is adapted to receive a coloured tone value $C_r$ that has been extracted from image data $I_r$ corresponding to a pixel of an image to be printed and to convert said tone value into a mapped tone value $C_m$. The mapping generator 1210 is also adapted to supply a mapped tone value $C_m$ to the comparator 1140 and to receive a mapping signal MS from the controller 1220.

The comparator 1140 is operably connected to the mapping generator 1210, the threshold array 1130 and the controller 1220. The comparator 1140 is adapted to receive the mapped tone value $C_m$ from the mapping generator 1210 together with a threshold value T generated using the two-dimensional threshold array 1130. Like the system illustrated in FIG. 11, the two-dimensional threshold array 1130 is adapted to receive an X, Y co-ordinate of the present pixel to be printed and to use the co-ordinate values to look up a suitable threshold value T within the threshold array 1130. The comparator is adapted to compare the two input values $C_m$ and T and produce a comparator output CO that is dependent on the result of the comparison. The comparator is then further adapted to pass the comparator output CO to the controller 1220.

Figure 1:
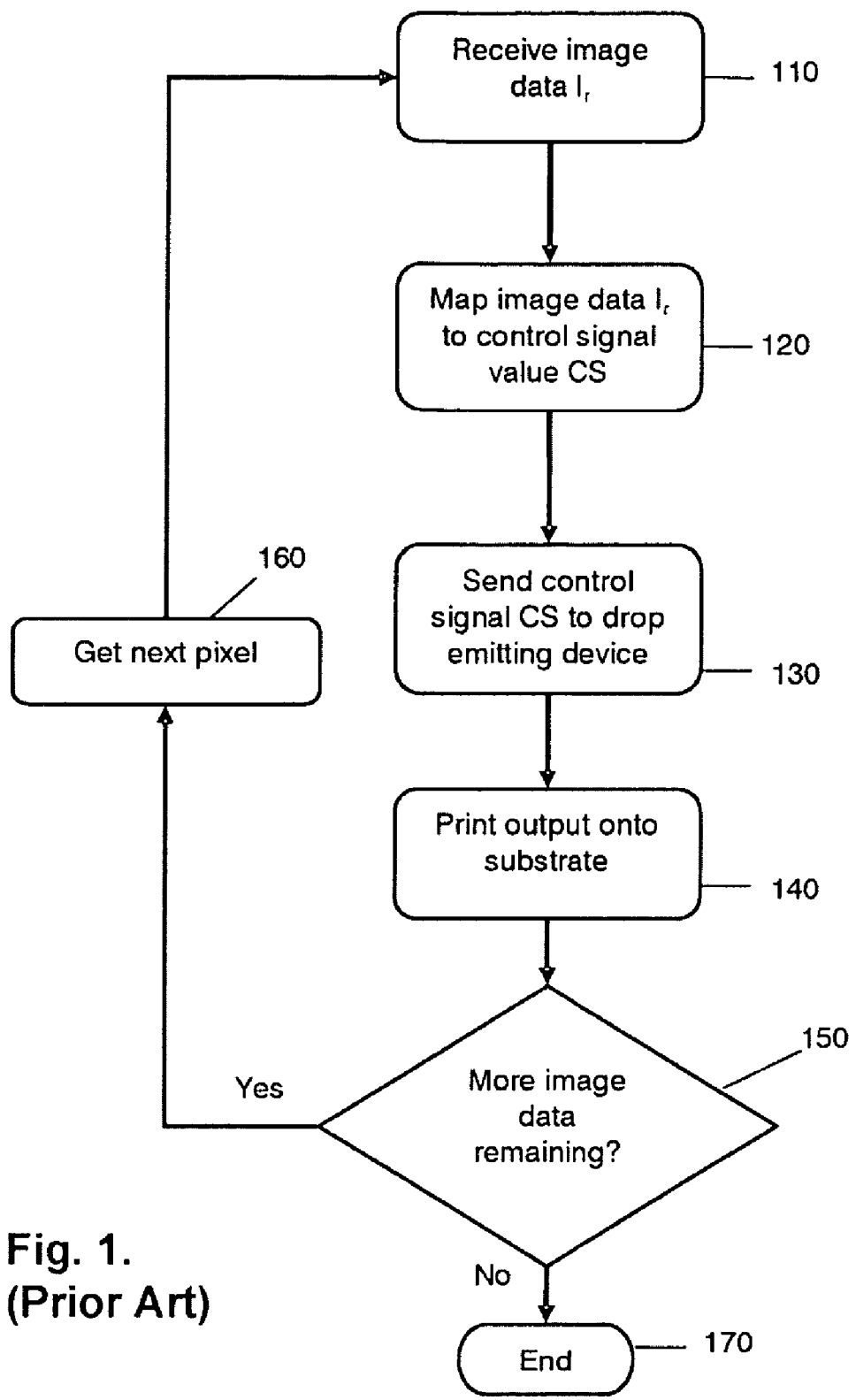
FIG. 1 is a flow chart illustrating the steps involved in printing a pixel in a prior art printing system.

FIG. 2 shows a multilevel screening method to be implemented using the printing system of FIG. 12. The method of FIG. 2 presents a new alternate method for implementing step 120 as illustrated in FIG. 1. Returning to FIG. 1, a method according to a first embodiment of the present invention will begin by receiving image data $I_r$ as is illustrated in step 110. This image data $I_r$ typically comprises a pixel of a contone CMYK image or an image scanline comprising a row of such pixels. This contone CMYK image can optionally be pre-processed to colour managed CMYK values using a colour management system (CMS). A typical CMS will produce a pixel with four data elements, each element typically being 16 bits in length and coding for one of the CMYK colour components. If a CMS system has not been used then the pixel data may comprise four data elements, each element typically being 8 bits in length. The methods and systems of the present invention may also equally be applied to grayscale image data, in which case the pixel data will only comprise a single data element corresponding to the pixel's gray level. After a pixel has been received and pre-processed at step 110, the method proceeds to step 120, wherein the steps illustrated in FIG. 2 are implemented.

At step 210, a tone value $C_r$ corresponding to a one of the data elements of the pixel is extracted from the received image data $I_r$. The tone or image value is typically an n bit data value coding for $2^n$ possible tone values ranging from light to dark for each colour component. The extracted tone value $C_r$ may optionally be converted to a set number of bits for ease of processing. For example, the print system 1200 may be adapted to use 10 bit data values throughout; and so, if this is the case, received 8 bit data elements will be shifted up by 2 bits whereas 16 bit data elements will be shifted down by 6 bits; typically by using an 8 or 16 bit to 10 bit converter comprising part of pixel receiving means 1110. If the system uses a 10 bit tone value then the tone range will be from 0 to 1023. In such a case, a value of 0 will typically code for the darkest tone and a value of 1023 will typically code for the lightest tone. Pixel receiving means 1110 then passes the extracted tone value $C_r$ to the mapping generator 1210. At the same time, the X and Y values for the received pixel are passed to the two-dimensional threshold array 1130. At step 220, this then enables the threshold array 1130 to produce a threshold value T.

At step 230, the received tone value $C_r$ is mapped to a map tone value $C_m$ by mapping generator 1210. Mapping generator 1210 comprises a series of software routines or hardware adapted to map a received tone value $C_r$, with a value within a first range of tone values, to a mapped tone value $C_m$, with a value within a second range of tone values. Typically, the first range comprises a subset of the full range tone values and the second range comprises the full range of tone values. For example the mapping generator 1310 may be adapted to map a received tone value $C_r$ within a first range of 0 to 127 to a range of mapped tone values $C_m$ within a second range of 0 to 1023. The mapping generator 1210 may be adapted to use a variety of mapping functions to perform this mapping depending on various image processing considerations.

At step 250 the mapped tone value $C_m$ is compared with the threshold value T generated by the threshold array 1130. This comparison is performed by comparator 1140. In the example shown in FIG. 2, the comparator checks to see whether the threshold value T is greater than or equal to the mapped tone value $C_m$. The comparator 1140 then outputs a value CO representative of the results of the comparison. In the present example binary comparator is used, however it is also possible to use non-binary comparators, for example comparators that output the difference of the two compared values. In the present case, if the threshold value T is greater than the mapped tone value $C_m$, the comparator output CO will have a binary value of 1 and if it is not the case, the output of the comparator CO will have a binary value of 0. The comparator output CO is then passed to controller 1220.

In the present example, if the comparator output CO is positive (i.e. binary 1), then the controller 1220 is adapted to generate a control signal CS as illustrated in step 260. This control signal CS is dependent on the comparator output CO. The form of the comparator output is set by convention and so it is possible to alternatively use different comparator outputs (e.g. the inverse of the above) and configure the controller 1220 accordingly. The control signal CS will be of a form adapted for the multilevel drop emitting device 1250; for example, the control signal CS may be a three bit value and the controller 1220 may be adapted to set this control signal CS to a value of 7 if the comparator output 1255 is positive. The method will then return to step 130 in FIG. 1 and the control signal will be sent to the drop emitting device in order to print an output onto the substrate as shown in step 140.

In the present case, if the output of the comparator CO is binary 0 then the controller 1220 is further adapted to send a mapping signal MS to mapping generator 1210. This mapping signal MS is designed to tell the mapping generator 1210 to alter the mapping method as is shown in step 240 in FIG. 2. The method then returns to step 230 in FIG. 2 and the received tone value $C_r$ is again mapped to a map tone value $C_m$; however, this time the mapping generator 1210 is adapted to use a different mapping method from that used the first time step 230 was initiated. Thus it may be the case that a different mapped tone value $C_m$ is generated. The newly created map tone value $C_m$ is then again compared with the same threshold T by a comparator 1140, shown in step 250. The comparator output CO is then again communicated to the controller 1220 which is adapted to repeat steps 240, 230 and 250 until the comparator output CO is again positive. When the comparator output does become positive the controller is further adapted to make a note of the number of times the loop comprising steps 230, 250 and 240 has been repeated and to set the control signal CS accordingly. For example, if the comparator output CO is set to positive on the third iteration of steps 230, 250 and 240 then the controller 1220 may be adapted to a set the control signal CS to a medium drop level, e.g. a value of 4 for a 3 bit system. However, if the iteration has been performed twice, then the controller 1220 may be adapted to set the control signal CS to a higher level, e.g. a value of 5 in a 3 bit system, upon receipt of a positive output from a comparator 1140. The control signal CS is then again passed to drop emitting device 1250 and the flow of the method returns to step 130 in FIG. 1.

The above method is repeated for all the pixels within one image scanline and then is again repeated for each scanline within the image. Thus, at step 150, the method checks to see whether there are any image data remaining and if there are, the next pixel in the scanline, or the first pixel in a subsequent scanline, is fetched at step 160 and the method repeats with step 110.

The method described above thus allows a multilevel drop emitting device 1250 to be used and the control signal CS to be selected from a group of control signals based on a screening operation. Furthermore, the method uses a mapping process and a comparison operation to determine which control signal value within a group of control signal values is used to control the drop emitting device 1250.

Figure 3:
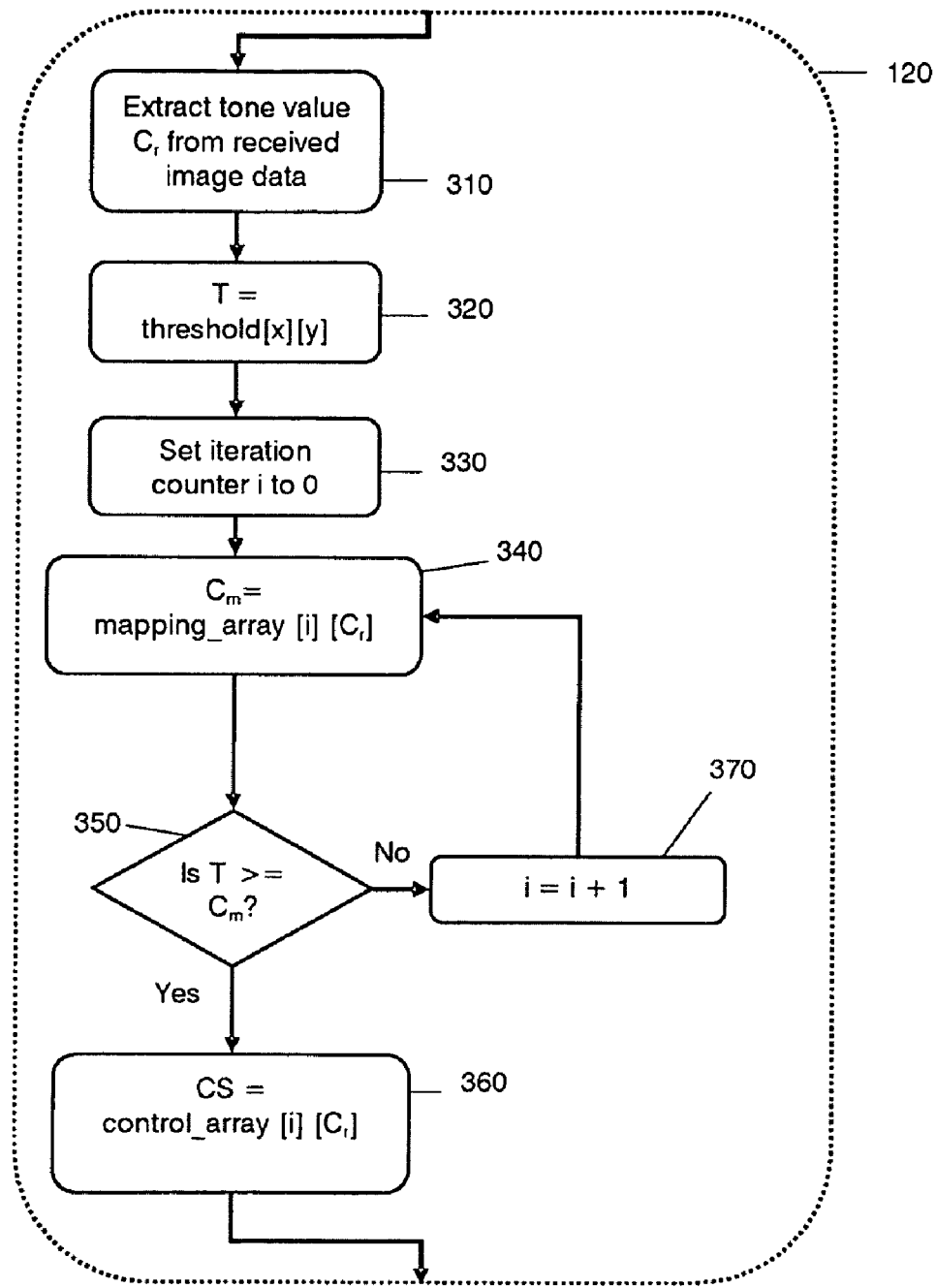
FIG. 3 is a flow chart showing an example of a series of method steps in accordance with a second embodiment of the present invention.
Figure 13:
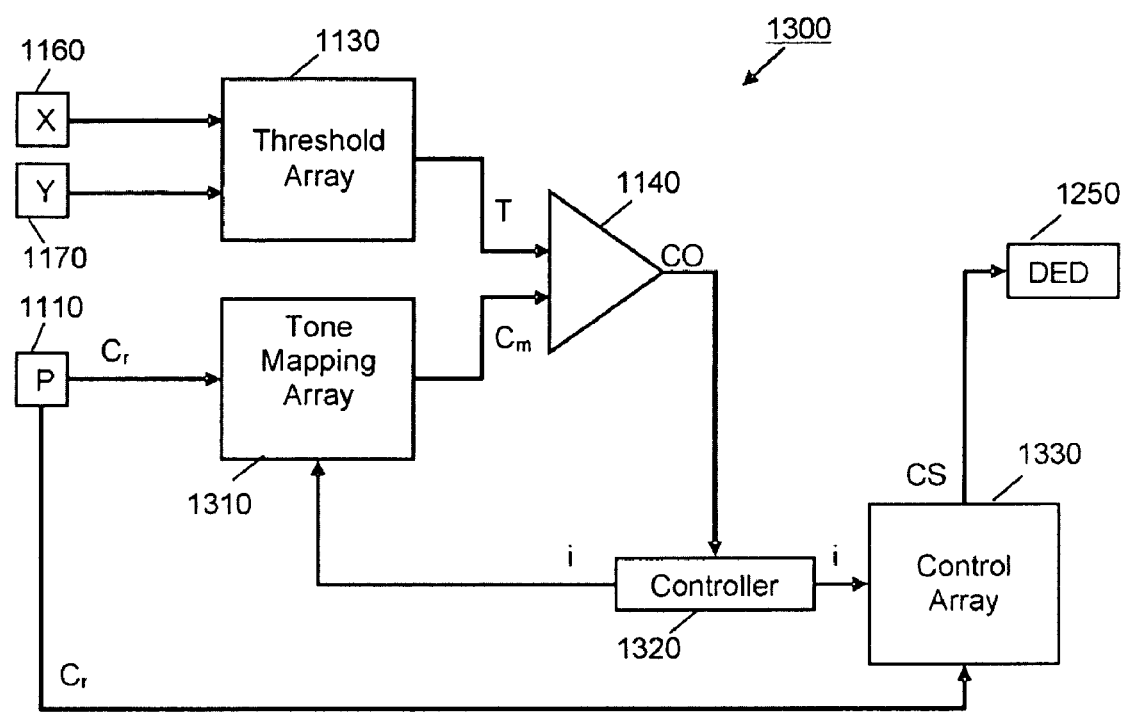
FIG. 13 is an example of a multilevel screening system according to a second embodiment of the present invention.

A second embodiment of the present invention is shown in FIGS. 3 and 13. The printing system 1300 of FIG. 13 comprises pixel location generators 1160 and 1170, pixel receiving means 1110, threshold array 1130, comparator 1140 and drop emitting device 1250. These components are implemented in a similar manner to those shown in FIG. 12. Printing system 1300 then further comprises a two-dimensional tone mapping array 1310, an extended controller 1320 and a two-dimensional control array 1330.

The two-dimensional tone mapping array 1310 is adapted to retrieve a mapped tone value $C_m$ based on a received tone value $C_r$ and an index i received from controller 1320. Two examples of this two-dimensional tone mapping array 1310 are shown in FIGS. 5 and 6. FIG. 5 shows a two-dimensional tone mapping array 500 wherein the array is configured to be used with a printing system 1300 capable of three iterations. The array comprises a plurality of columns 520 and a series of rows 510. Each column 510 is indexed by one or more received tone values $C_r$. For example, in the example shown in FIG. 4, the first column is used to map received tone values within a range 0 to 127.

Figure 9:
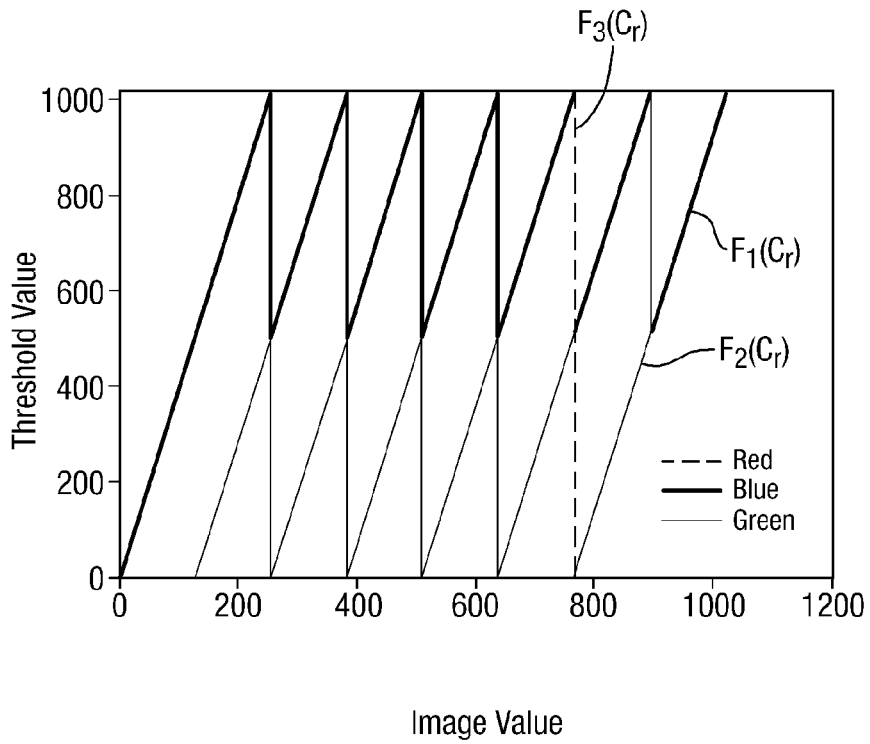
FIG. 9 is a graph illustrating the three mapping functions used to produce the two-dimensional array of FIG. 5.

The rows of the array 500 are indexed by an iteration counter i. Each element of the array 500 is indexed by a row value 510 and a column value 520. In certain embodiments, the array 500 may comprise a column for every received tone value $C_r$, e.g. the array 500 could have 1024×3 elements, wherein each element comprises a stored value which is then returned as the mapped tone value $C_m$. In this case the elements of the array 500 may be generated beforehand using functions $F_1$, $F_2$ and $F_3$ as illustrated in FIG. 9. FIG. 9 shows each function as a different line type (thick, thin, and dashed), which have been respectively labelled "Blue", "Green" and "Red" for convenience. The colours and line types used to label the functions in FIG. 9 are arbitrary and are unrelated to the function of the invention. In other embodiments, as partly illustrated in FIGS. 5 and 6, each element of the array may comprise or link to a function of the received tone value $C_r$. For example, FIG. 9 illustrates three functions that divide the received tone value scale into seven equal segments wherein each segment has a range of 14.28 percent of the possible received tone values $C_r$. In either case, each of the functions $F_1$, $F_2$ and $F_3$ will be used in some manner to produce a mapped tone value $C_m$.

Figure 10:
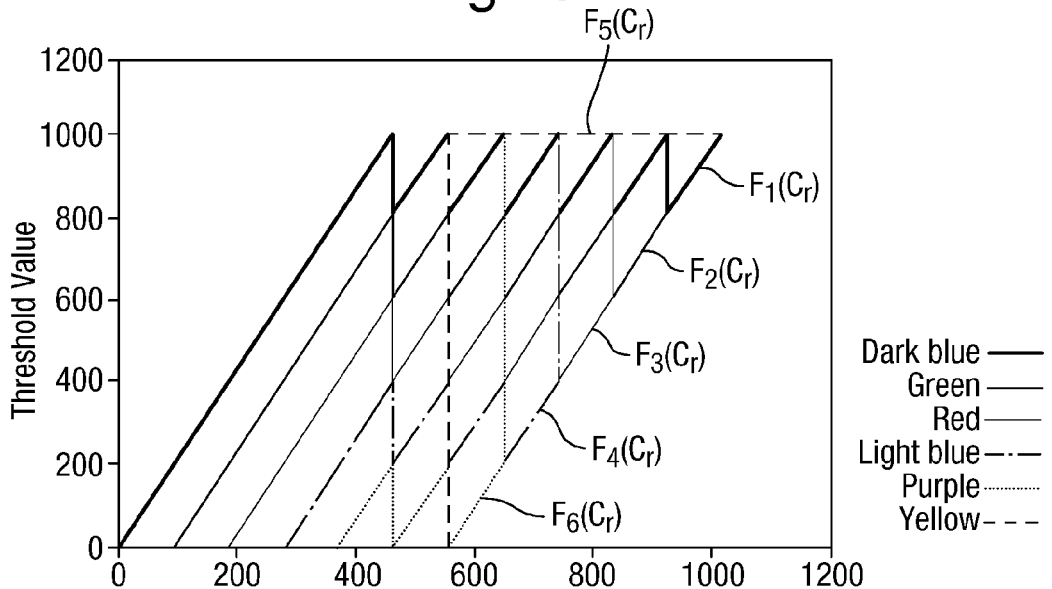
FIG. 10 is a graph illustrating the five mapping functions used to produce the two-dimensional array shown in FIG. 6.

FIG. 6 shows a different example in which up to five iterations may be performed. Tone mapping array 600 comprises five rows 610 and a series of columns 620. In a similar manner to the array 500 of FIG. 5 the functions $F_1$ to $F_5$ to be used to create a mapped tone value $C_r$ are shown in FIG. 10. FIG. 10 shows each function as a different line type, wherein each function or line type is also labelled with a different "colour" for convenience. The colours and line types used to label the functions in FIG. 10 are arbitrary and are unrelated to the function of the invention. In certain embodiments, the array 600 may comprise a column for every received tone value $C_r$, e.g. the array 600 could have 1024×5 elements, wherein each element comprises a stored value which is then returned as the mapped tone value $C_m$. Functions $F_1$ to $F_5$ (630 to 670) may then be used to populate the array. The maximum number of rows 510, 610 within the tone mapping array is typically set as the maximum number of drop levels capable of being emitted by the drop emitting device 1250, for example eight rows if the drop emitting device is responsive to a three bit control value. The tone mapping array may also be implemented as a plurality of look-up tables, wherein each row or column comprises a separate table, or may be implemented as one or more software functions adapted to receive an iteration index i and a received tone value $C_r$ and output a mapped tone value $C_m$.

Printing system 1300 also comprises a control array 1330 that is implemented in a similar manner to the tone mapping array 1310. The control array 1330 is configured to retrieve and output a control signal value CS based on a received tone value $C_r$ and an index i. This index i may be an iteration counter. FIG. 7 illustrates a control array to be used with a maximum of three iterations and FIG. 8 illustrates a control array to be used with a maximum of five iterations, in a similar manner to respective FIGS. 5 and 6. Each array 700, 800 comprises a number of rows 710, 810 and a number of columns 720, 820. The columns are indexed by one or more received tone values $C_r$ and the rows are indexed by the index i, which can be an iteration counter. In the present example, each element 730, 830 of the control array 1330 contains a three bit control signal value CS which will instruct the drop emitting device 1250 to emit a set quantity of ink: with a range from 0, which will instruct the drop emitting device not to emit any drops of ink, to 7, which will instruct the drop emitting device to emit 7 drops of ink. The form and range of this control signal value CS is dependent on the type of drop emitting device used and so may vary from the example described herein.

A method of creating a suitable control signal using the printing system 1300 is illustrated in FIG. 3. The printing method begins with step 110 of FIG. 1, wherein image data $I_r$ is received. The method then moves to step 120 which, in this case, is implemented by the method step illustrated in FIG. 3. The tone value $C_r$ is first extracted from received image data $I_r$ at step 310. This is performed by the pixel receiving means 1110 as was described with relation to FIG. 12. At the same time or subsequently, at step 320, a threshold value T is generated using the threshold array 1130 which takes as input an X co-ordinate 1160 and a Y co-ordinate 1170 of the pixel. At step 330, the controller 1320 sets the index or iteration counter i to an initial value. In the present example, the iteration counter is incremented from 0 to a maximum value. In other embodiments the iteration counter can alternatively be decremented from a maximum value to a minimum value, although this may require altering the threshold comparison or the operation of the controller 1320. The controller 1320 then passes the iteration counter i to the tone mapping array 1310. At step 340, the tone mapping array 1310 uses the received tone value $C_r$ and the iteration counter i as indices to select an appropriate mapped tone value $C_m$. At step 350, the threshold value T is compared with the mapped tone value $C_m$. The comparison is performed by comparator 1140 which examines whether the threshold value T is greater than or equal to the mapped tone value $C_m$. If the threshold value T is not greater than or equal to the mapped tone value $C_m$ then the comparator 1140 produces a comparator output CO with a first value. If the comparator 1140 finds that the threshold value T is greater than the mapped tone value $C_m$ then the comparator 1140 produces a comparator output CO with a second value. The comparator output CO is then passed to the controller 1320.

If the comparator 1140 is a binary comparator then the second value is typically 0. On receipt of the second value the controller 1320 is adapted to increment the iteration counter i at step 370 and repeat step 340 a further time. This produces a first iteration of the method. In this case, a new mapped tone value $C_m$ is again generated using the tone mapping array 1310, the received tone value $C_r$ and the incremented index or iteration counter value i. The new mapped tone value $C_m$ is then again supplied to the comparator 1140 to be compared with the threshold value T. A new comparator output CO is then generated. If this comparator output CO is also negative the controller 1320 will again increment the iteration counter i and a second iteration will begin.

If the comparator output is a first value, e.g. 1, the controller 1320 is further adapted to halt the iteration of steps 340, 350 and 370 and pass the current iteration counter i to the control array 1330. The control array 1330 is adapted to receive the iteration counter i, together with a received tone value $C_r$, and to use these variables as indices to generate a control signal value CS as shown in step 360. This generation is performed using arrays such as those illustrated in FIG. 7 and FIG. 8. The resultant control signal value CS is then sent to the drop emitting device 1250, as in step 130, and an output is printed upon the substrate 140. As in the first embodiment, the above process is then repeated for further pixels within an image to be printed.

Figure 4:
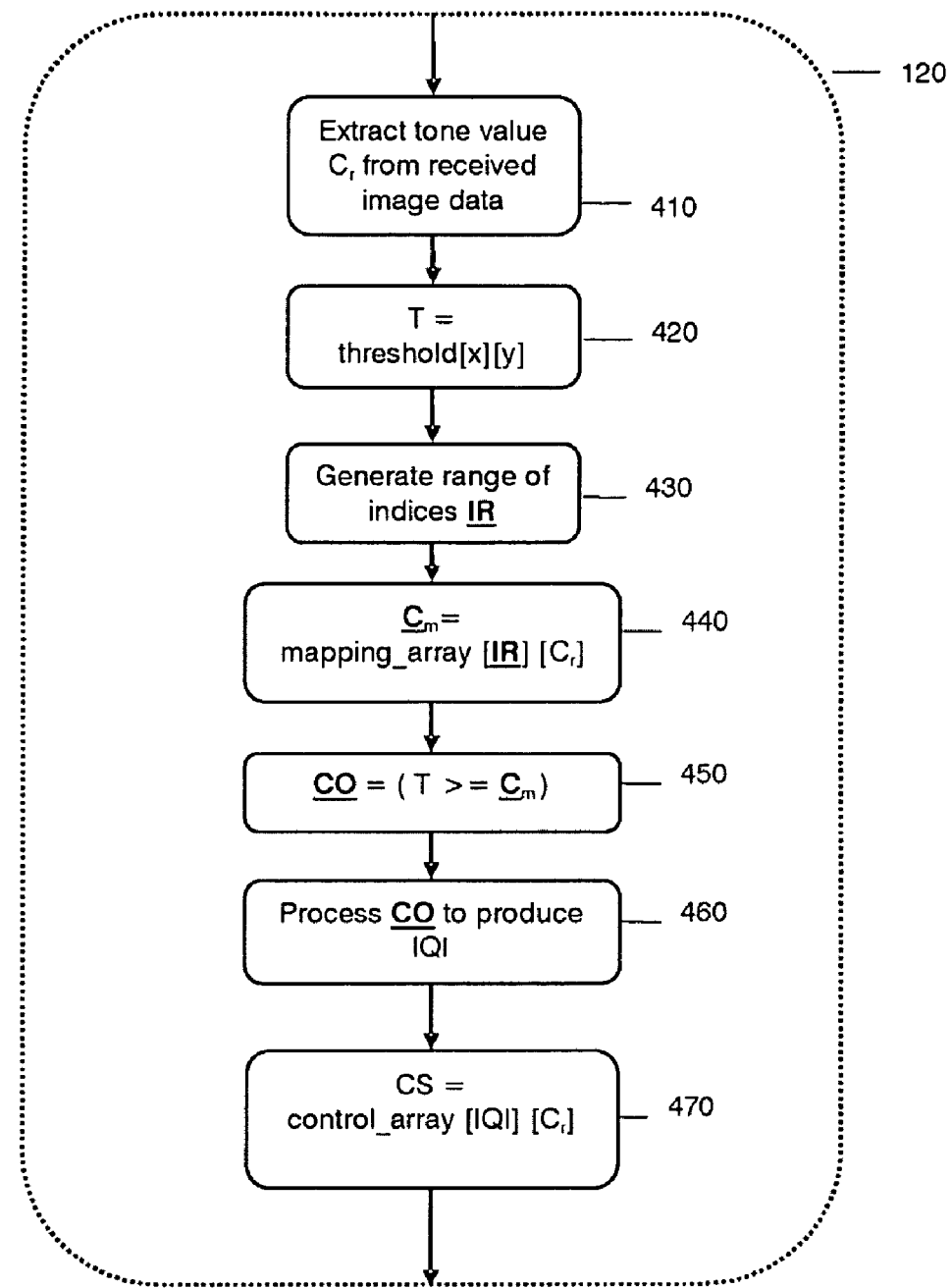
FIG. 4 is a flow chart showing an example of a series of method steps in accordance with a third embodiment of the present invention.
Figure 14:
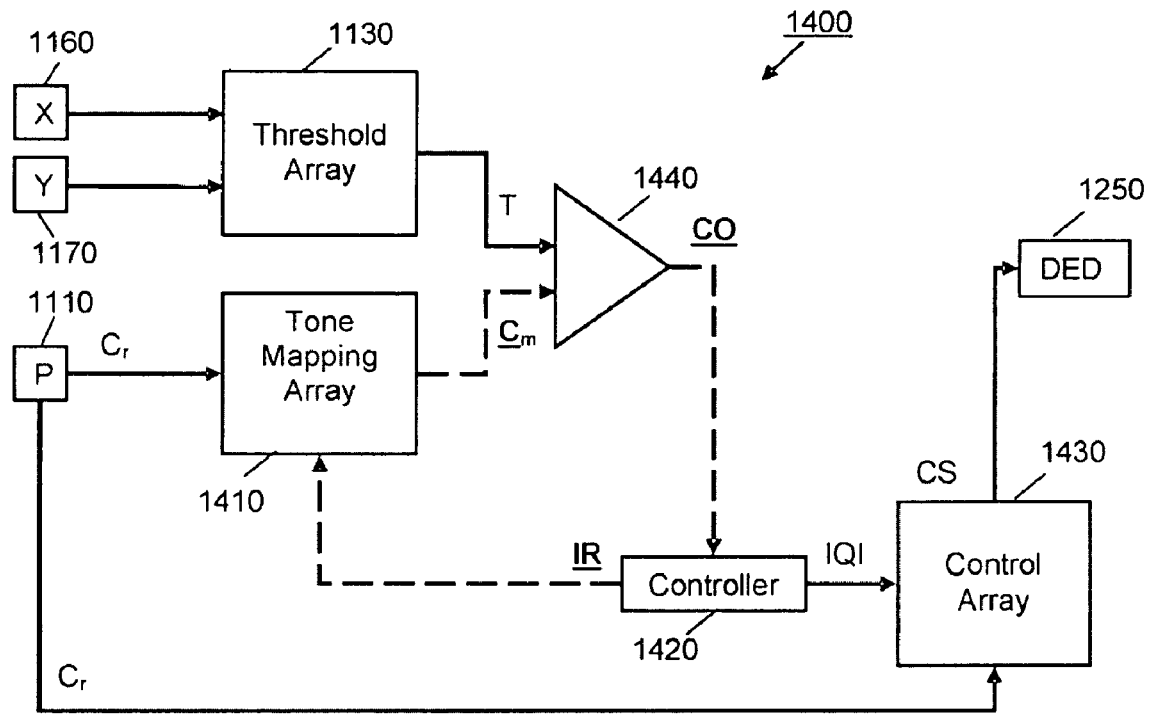
FIG. 14 is an example of a multilevel screening system according to a third embodiment of the present invention.

Steps 340 and 350, 370 are repeated as long as the comparator output CO is a second value, e.g. 0. In certain embodiments, the controller 1320 is further adapted to stop the iteration of steps 340, 350 and 370 when the iteration counter reaches a maximum value, e.g. $i_{max}=2$ as for the example of FIGS. 5 and 7 or $i_{max}=4$ as for the example of FIGS. 6 and 8. When $i_{max}=2$, the printing system 1300 and method as described above ensure that no more than fifty percent of any particular drop size or level, other than the largest drop size or level, is used. This method thus has improved linearity over a method using a binary drop emitting device. When $i_{max}=4$, the printing system 1300 and method as described above ensure that no more than twenty percent of any particular drop size or level, other than the largest drop size or level, is used. The number of iterations effectively sets the maximum number of different drop levels or sizes that may be printed for a set tonal range. For example, if $i_{max}=4$ then a maximum of five different ink quantities, printed using five different control signals, can be produced for a given tonal band. The ink quantities can form a non sequential group, e.g. each control signal may be selected from a group representing 1, 2, 5, 6, or 7 drops to be emitted, and the control mapping may select a control signal value from a group of values containing any combination of ink quantity levels. By reducing the likelihood that any particular drop size or level is repeatedly printed, e.g. repeatedly printed within a tonal band, the method prevents the appearance of "rain" and other print aberrations. The method and system do not need to vary the occurrence of the largest drop size or level, as this quantity of ink typically covers an allotted pixel area upon the substrate and thus does not lead to print aberrations FIGS. 4 and 14 illustrate a third embodiment of the present invention. In this embodiment, a multiple value comparison is performed using matrix algebra. As with the first and second embodiments, printing system 1400 comprises X 1160 and Y 1170 pixel location generators, threshold array 1130, pixel receiving means 1110 and drop emitting device 1250. However, in the third embodiment the printing system 1400 comprises a modified tone mapping array 1410, a modified comparator 1440, a modified controller 1420 and a modified control array 1430. The modified tone mapping array 1410 is substantially similar to the two dimensional tone mapping array of the second embodiment, however, the array 1420 is further adapted to use a plurality of indices IR to generate a plurality of mapped tone values $\underline{C}_m$. The modified comparator 1440 is adapted to receive a plurality of mapped tone values $\underline{C}_m$ and to generate a plurality of comparator outputs $\overline{CO}$. The modified controller 1420 is adapted to generate the plurality of indices IR and to generate an ink quantity index IQI based on an analysis of the comparator output $\overline{CO}$. The ink quantity index IQI is used to lookup a value within the control array 1430, in a similar manner to index i in the second embodiment.

The method of the third embodiment is shown in FIG. 4. As before, the method steps illustrated in FIG. 4 replace step 120 in FIG. 1. At step 410 a tone value $C_r$ is extracted from received pixel data as in the previous two embodiments. A threshold value T is then generated at step 420 using threshold array 1130 and the X and Y pixel co-ordinate values. At step 430, the controller 1420 generates a range of indices IR, typically in the form of a one-dimensional array or vector, e.g. [0,1,2] or [0,1,2,3,4]. The printing system 1400 is then adapted to lookup a plurality of mapped tone values $\underline{C}_m$ using the range of indices IR and the received tone value $\overline{C_r}$ 1115 to index the tone mapping array 1410. This can be performed using matrix software libraries or adapted hardware known in the art. The plurality of map tone values $\underline{C}_m$ are then provided in the form of a vector or a one-dimensional array to the modified comparator 1440, e.g. [560, 230, 110]. The modified comparator 1440 is adapted to compare each of the plurality of mapped tone values $\underline{C}_m$ with the threshold value T. This can also be performed using known matrix algebra. The result of this calculation in step 450 is a comparator output $\overline{CO}$ comprising a one-dimensional array or vector, e.g. [0,1,1] or [0,0,1,1,1]. Each entry in the comparator output $\overline{CO}$ typically corresponds to a comparison of a respective one of a plurality of mapped tone values $\underline{C}_m$ with threshold T. The comparator output $\overline{CO}$ is then passed to the modified controller 1420. At step 460, the modified controller 1420 is adapted to process the comparator output $\overline{CO}$ to produce an ink quantity index IQI. This can be performed using a truth table implemented in software and/or hardware. The ink quantity index IQI is a single value that is used to lookup an element of the controller array, together with the received tone value $C_r$, at step 470. The element of the array corresponds to a control signal value CS coding for the number of drops of ink that need to be emitted by the drop emitting device 1250. The control signal value CS is sent to the drop emitting device at step 130 and an output is printed on the substrate at step 140. The method is then repeated for additional pixels as required.

Figure 22:
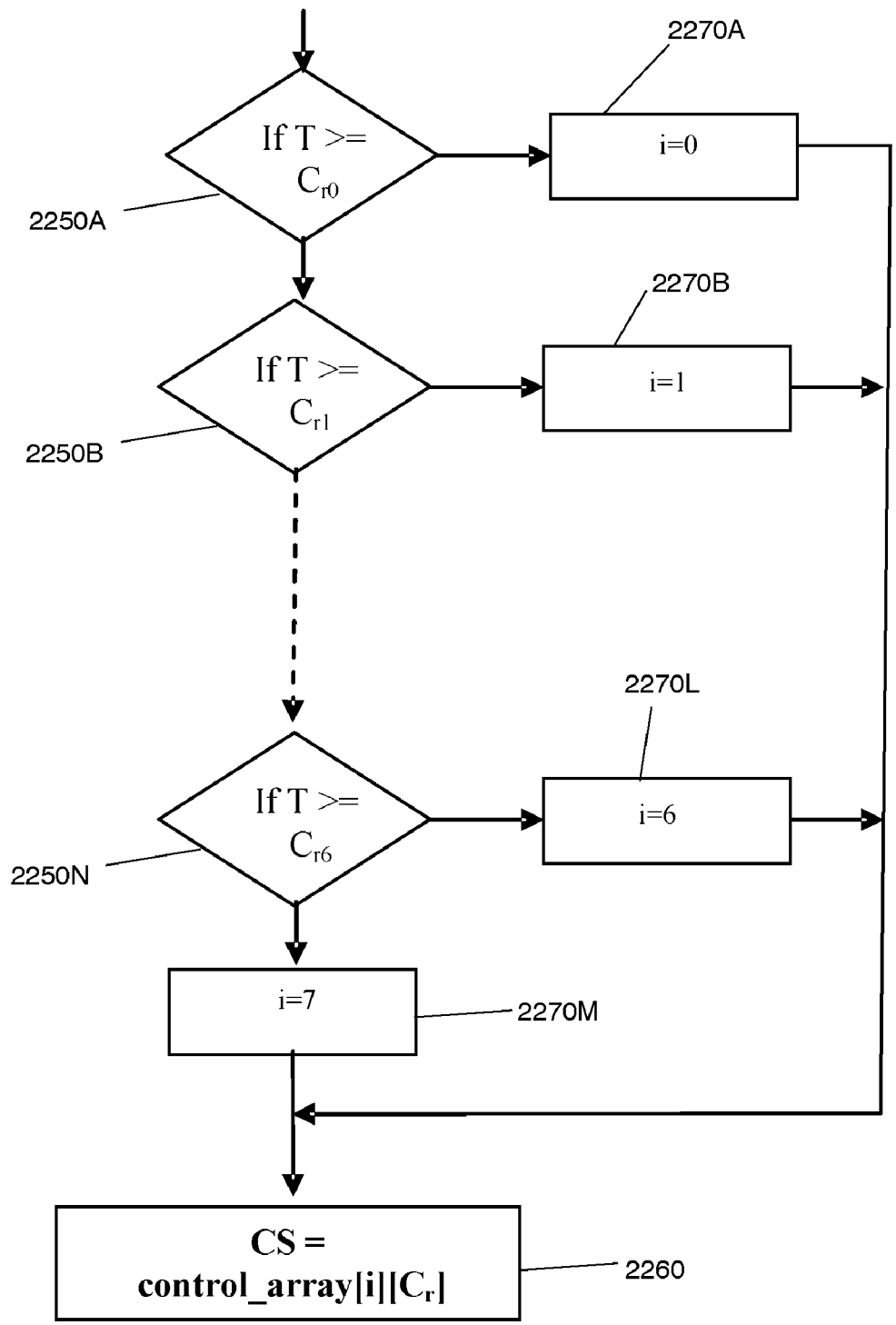
FIG. 22 is a flow chart showing an example of a series of method steps in accordance with a fifth embodiment of the present invention.

A series of method steps to be used in a fifth embodiment of the present invention are illustrated in FIG. 22. These steps represent an alternate method of performing steps 340 to 370 in FIG. 3 or steps 450 to 470 in FIG. 4. The method begins by calculating a plurality of mapped tone values $C_{r1}$ to $C_{rN}$, where in this case N=6. These can be calculated using a step similar to step 440 in FIG. 4 or by an alternate method. A threshold value T, generated as in steps 320 or 420, is then compared with each of the mapped tone values in series in steps 2250A to 2250N. If the comparison returns an indication of a first relationship, e.g. 1 representing that T is greater than or equal to the mapped tone value, then a value of index i is set in one of steps 2270A to 2270L. If the comparison returns an indication of a second relationship, e.g. 0 representing that T is less than the mapped tone value, then another comparison is performed using a new mapped tone value, e.g. from step 2250A the process moves to step 2250B. If the last comparison in the chain returns an indication of a second relationship then index i is set to a maximum value, in this case 7, at step 2270M. After a value of i has been set at any of steps 2270A to 2270M the method then proceeds to step 2260, wherein a control signal value CS is calculated in a similar manner to steps 360 and 470. This control signal value CS is then sent to the drop emitting device 1150.

When implementing the present invention, the screening methods and the use of variable drop sizes may result in a non-ideal printed tone scale. This non-ideal printed tone scale is typically highly non-linear and has a high dot gain when compared to a reference case. Therefore, to achieve a consistent and pleasing tone scale, it may be necessary to calibrate the mapping process and/or the values in two-dimensional arrays 1310 and 1330. Such a calibration is optional and does not form an essential part of the present invention.

Figure 15:
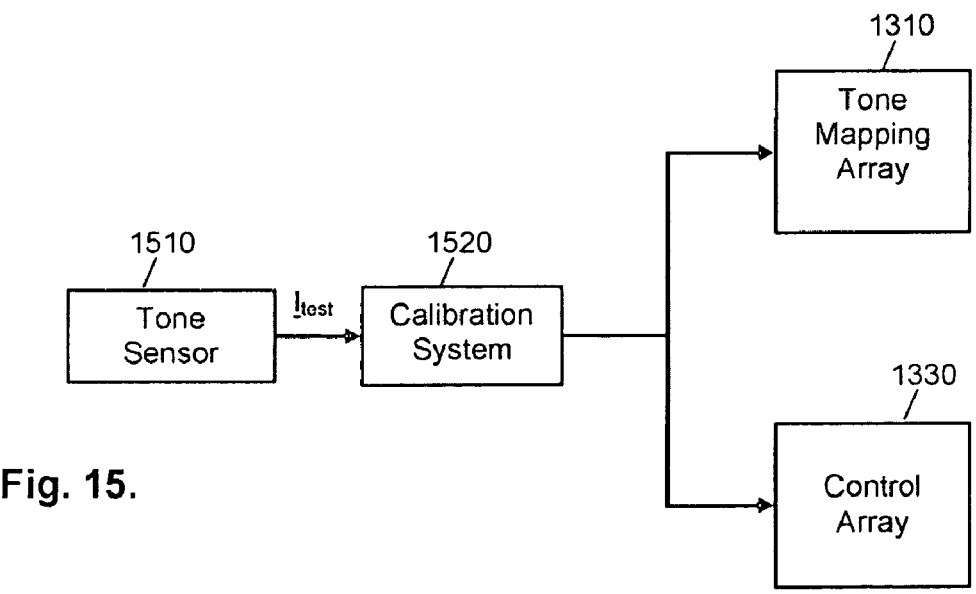
FIG. 15 is an example of a calibration system for use in a multilevel screening system according to a fourth embodiment of the present invention.
Figure 16:
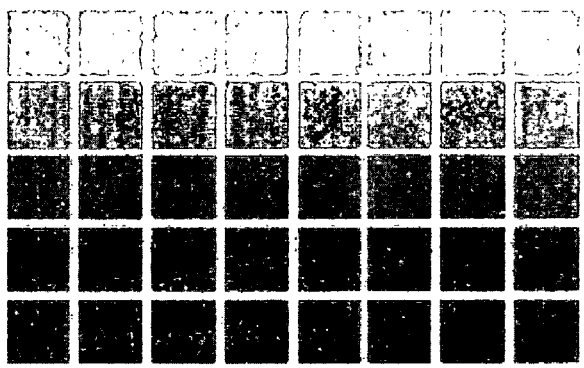
FIG. 16 is a first example of a test printed output generated according to a fourth embodiment of the present invention.
Figure 17:
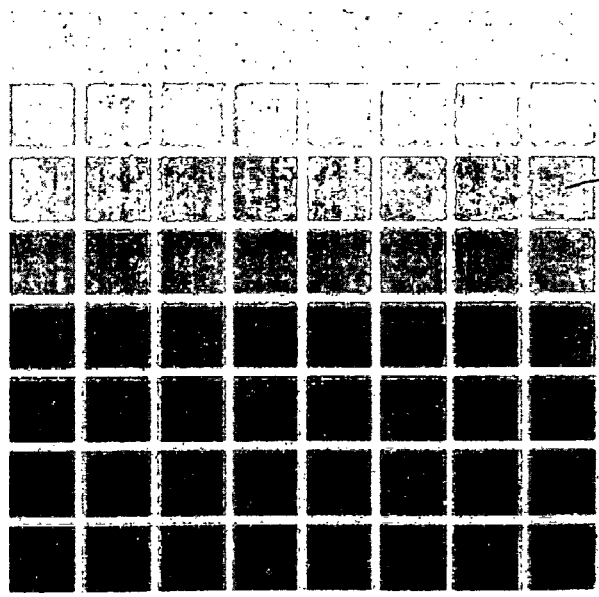
FIG. 17 is a second example of a test printed output generated according to a fourth embodiment of the present invention.

The calibration is performed using the system of FIG. 15. In order to perform the calibration a test chart must first be printed using one of the systems shown in FIGS. 11 to 14. The form of the test chart will depend on the specific configuration of the printing system. An example of a test pattern for a printing system with one iteration ($i_{max}=0$) is illustrated in FIG. 16 and an example of a test pattern for a printing system with five possible iterations ($i_{max}=5$) is illustrated in FIG. 17. Each test pattern comprises a number of tonal blocks 1710 covering the full range of possible tone values (e.g. 0 to 1024), wherein each tonal block corresponds to a set range of received tone values $C_r$ (e.g. 128 to 255) and the blocks become darker towards the bottom of each test print. Each tonal block 1710 will be printed using a plurality of drop emitting devices, each drop emitting device operating according to the present invention. The tonal blocks 1710 are also repeated in a horizontal direction across the substrate to give a good range of tonal test blocks to be measured, for example if one or more malfunctioning drop emitting devices were present in a particular tonal block with a row of blocks then the measurements for this particular block would be discounted. Typically, only one of the columns of the test print will be measured and the column with the best jetting and no malfunctioning drop emitting devices will be selected. The number of ink quantity levels used to produce each tonal block 1710 is displayed to the left of the test print. For a colour printing system a test print such as those shown in FIGS. 16 and 17 will be printed for each individual colour component, e.g. cyan, magenta, yellow and black.

The system of FIG. 15 is used to measure the test print and update the mapping processes or the mapping arrays 1310 and 1330 accordingly. The present example illustrates a case where the calibration process updates tone mapping array 1310 and the control mapping array 1330, however, the present invention is not limited to such an update. The test prints are first of all measured using a tone sensor 1510 such as a spectrophotometer. A particular column of tonal blocks will be chosen as described above. The tone sensor 1510 will take a measurement of the plurality of tonal test blocks 1710, for example measurements in C.I.E. X, Y, Z colour space. These measurements will then be used to compute the effective drop area based on the Murray-Davies equation shown below:

$$EDA\% = 100 * \frac{\left(1 - \frac{m_s}{m_{white}}\right)}{\left(1 - \frac{m_{solidInk}}{m_{white}}\right)}$$

wherein: $m_{white}$ is a measurement of the tone or colour of the substrate; $m_{solidink}$ is a reference measurement of 100% tint (i.e. a patch of solid ink) and $m_s$ is a measurement of the sample in question.

In the equation above the m (measurement) variable above will depend on the colour component: for cyan ink m equals the X measurement; for magenta ink m equals the Y measurement; for yellow ink m equals the Z measurement and for black ink m equals the Y measurement.

Figure 18:
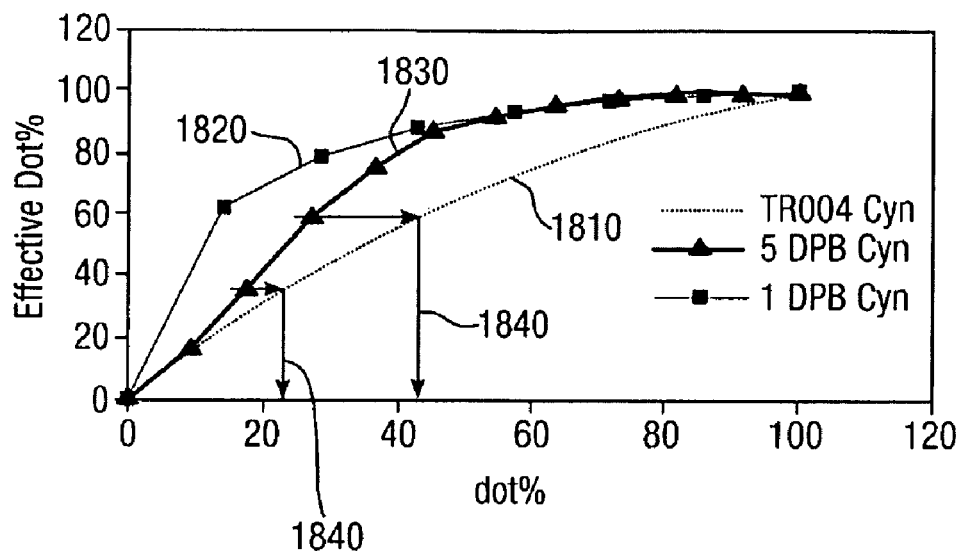
FIG. 18 is a graph illustrating a reference dot gain characteristic curve and two measured dot gain characteristic curves.
Figure 19:
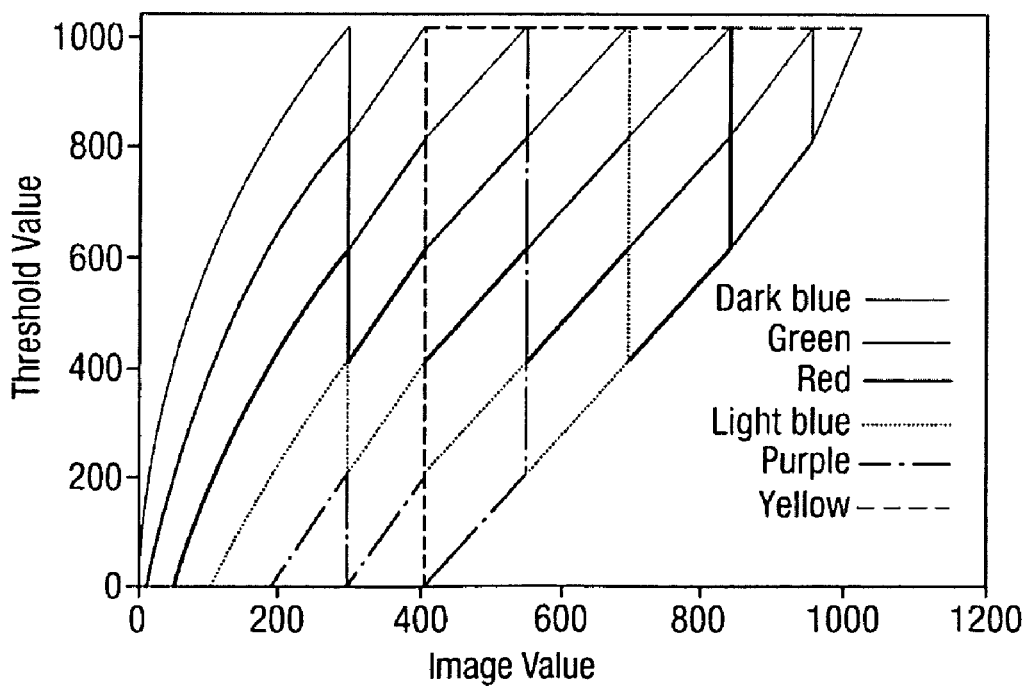
FIG. 19 is a graph illustrating five calibrated mapping functions.

The above calculation is performed by the calibration system 1520 based on the measurements $I_{test}$ sent from the tone sensor 1510 and is used to generate a measured dot gain characteristic curve as shown in FIG. 18. The calibration system 1520 is adapted to compare the measured dot gain characteristic curve 1820 (from FIG. 16) or 1830 (from FIG. 17), respectively representing one drop per band ("1 DPB Cyn") and five drops per band ("5 DPB Cyn"), with a reference dot gain characteristic curve 1810 (labelled as "TR004 Cyn") stored within, or looked up by, the calibration system 1520. FIG. 18 shows the respective curves using the colour cyan ("Cyn") as an example. The calibration system 1520 will effectively map the measured dot gain characteristic curve 1820 or 1830 onto the reference dot gain characteristic curve 1810 using a piecewise linear transform. This process is illustrated by arrows 1840 in FIG. 18. This mapping of the measured curve onto a reference curve is then used to generate a set of mapping configurations or a set of updated array elements. In the latter case, as shown in FIG. 15, the updated array elements are sent from the calibration system 1520 to tone mapping array 1310 and control array 1330 and the arrays are updated accordingly. A plurality of altered functions that may be used to update the tone mapping array 1310 are shown in FIG. 19. FIG. 19 shows each function as a different line type, wherein each function or line type is also labelled with a different "colour" for convenience. The colours and line types used to label the functions in FIG. 19 are arbitrary and are unrelated to the function of the invention.

By comparing FIG. 10 with FIG. 19, it can be seen that the calibration system has modified the tone mapping array 1310 in order to produce a non-linear mapping.

Figure 20:
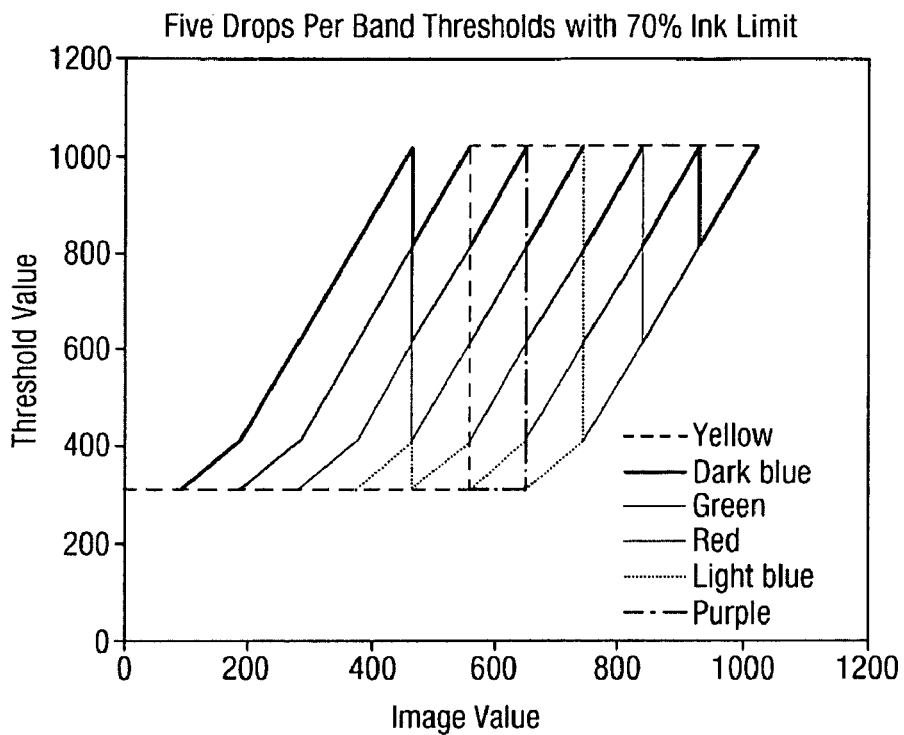
FIG. 20 is a graph illustrating five mapping functions with a 70% ink limit.

In certain embodiments, it may be desirable to limit the maximum amount of ink printed upon a substrate. For example, certain substrates may only be able to hold a certain quantity of ink. In these cases the controller 1220 to 1410 may be adapted to limit the control signal value CS or alternatively the functions used to generate the tone mapping array 1310 or 1410 may be limited as shown in FIG. 20. FIG. 20 shows each function as a different line type, wherein each function or line type is also labelled with a different "colour" for convenience. The colours and line types used to label the functions in FIG. 20 are arbitrary and are unrelated to the function of the invention.

In the example mapping arrays of FIGS. 5 and 6 the tone range was divided into a number of equal size segments (e.g. 0-127). In each segment a number of different ink quantity levels were used to generate a given tone value. This resulted in a fixed dot percentage range being covered by each segment, e.g. for a system with 3 different drop levels each drop level in each segment would cover 33% of the area to be printed. However, in some cases it may be required to change the dot percentage for each band, i.e. change the proportion of a certain drop size used for a given tone value within a tone segment. In a preferred case a gradual change in dot percentage is required for each band. For example, if 3 drops are used to print a given range or segment of tone values, then the tone mapping can be calibrated so that the first ink quantity level (e.g. all 3 drops) only covers 27% of the area to be printed, i.e. the tone mapping is applied so that 27% of the pixels printed at a given tone level are of the first ink quantity level. The mapping in further segments can then be calibrated to effect a gradual change in dot percentage across the segments, e.g. so that the first ink quantity level covers 28% in a second segment and 29% in a third segment.

Figure 21:
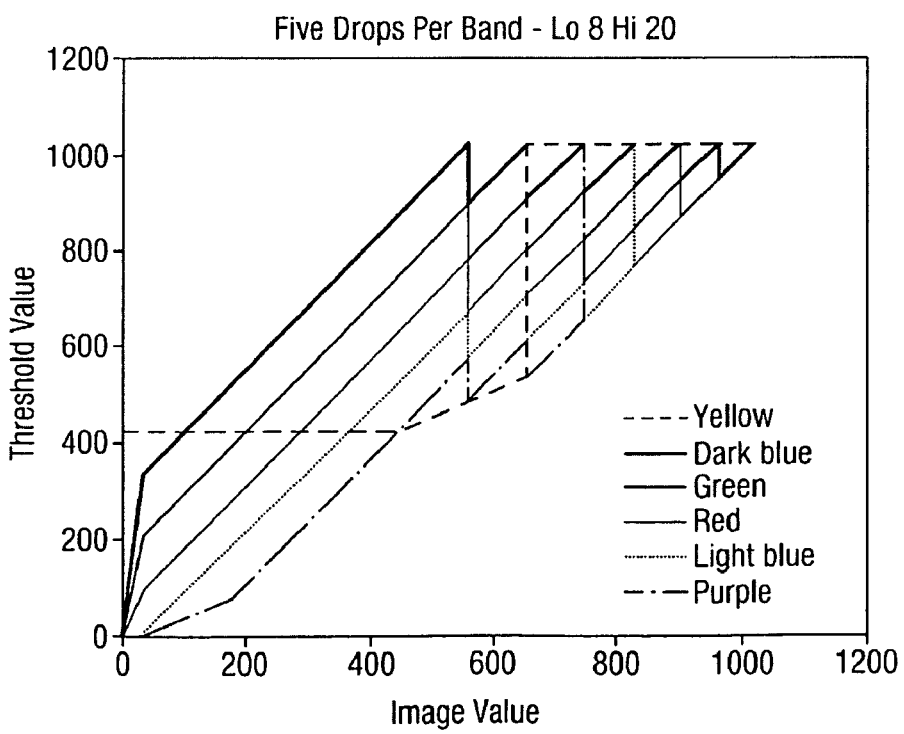
FIG. 21 is a graph illustrating five further adjusted mapping functions for use with the present invention.

FIG. 21 illustrates the case wherein the values within the tone mapping array are calibrated so that the dot percentage change per segment is increased from a low value of 8% to a high value of 20% in a gradual manner. This could alternatively be performed by calibrating a tone mapping process. This results in tone segments at the light end of the tone scale (e.g. towards a tone value of 1023) having a smaller change in dot percentage and the segment width is gradually increased from segment to segment to accommodate the desired increase in dot percentage range for a given segment. FIG. 21 shows each function as a different line type, wherein each function or line type is also labelled with a different "colour" for convenience. The colours and line types used to label the functions in FIG. 21 are arbitrary and are unrelated to the function of the invention.

The first to fourth embodiments can be implemented using software and/or hardware systems. As typically each of the printing systems 1200 to 1400 is adapted to receive a tone value $C_r$ for a given colour component a full colour printing apparatus will typically use a plurality of such systems in parallel to generate multilevel screened values for the plurality of colour components, e.g. in a CMYK system produce four sets of control signal values CS. Each control signal value CS can then be used by a corresponding drop emitting device adapted to emit an ink of a separate colour. Alternatively, each colour component could be sent in series to a single printing system such as 1200 to 1400. Commonly, different colour components will require different mapping operations and/or threshold arrays.

We claim:

1. A method of producing a printed output on a substrate using a drop emitting device adapted to emit a plurality of ink quantities in response to a control signal, the method comprising the steps of:
   a. receiving image data corresponding to a pixel of an image to be printed, the received image data comprising a tone value;
   b. generating a threshold value for use in a screening operation based on the location of the pixel within the image to be printed;
   c. mapping the received tone value to a mapped tone value using a first tone mapping, the mapped tone value being generated based on the received tone value;
   d. performing the screening operation by comparing the mapped tone value with the threshold value;
   e. mapping the received tone value to a control signal value using a first control mapping if the output of the comparison performed in previous step (d) indicates a first relationship, the control signal value being generated based on the received tone value; and
   f. repeating steps (c) to (f) if the output of the comparison performed in previous step (d) indicates a second relationship, wherein step (c) comprises using an alternate tone mapping and step (e) comprises using an alternate control mapping.

2. The method of claim 1, wherein the control signal value controls the number of drops of ink emitted from the drop emitting device and step (e) further comprises generating a control signal value inversely proportional to the number of iterations of steps (c) to (f) using the one or more control mappings.

3. The method of claim 1, wherein using one of the tone mappings comprises using a corresponding look-up table, each look-up table being indexed by the received tone value.

4. The method of claim 1, wherein using one of the tone mappings comprises using a two dimensional array indexed by the received tone value and the number of repetitions of steps (c) to (f).

5. The method of claim 1, wherein using one of the control mappings comprises using a corresponding control look-up table, each look-up table being indexed by the received tone value.

6. The method of claim 1, wherein using one of the control mappings comprises using a two dimensional array indexed by the received tone value and the number of repetitions of steps (c) to (f).

7. The method of claim 4, wherein:
   before step (c) the method further comprises setting an iteration counter to an initial value;
   step (f) further comprises, if the output of the comparison indicates the second relationship, incrementing the iteration counter; and
   each mapping comprises looking up a mapped output in one of the two-dimensional arrays using the received tone value and the iteration counter as indices.

8. A method of producing a printed output on a substrate using a drop emitting device adapted to emit a plurality of ink quantities in response to a control signal, the method comprising the steps of:
   a. receiving image data corresponding to a pixel of an image to be printed, the received image data comprising a tone value;
   b. generating a threshold value for use in a screening operation based on the location of the pixel within the image to be printed;
   c. mapping the received tone value to a plurality of mapped tone values using a corresponding plurality of tone mappings, the plurality of mapped tone values being generated based on the received tone value;
   d. performing the screening operation by comparing each of the plurality of mapped tone values with the threshold value; and
   e. mapping the received tone value to a control signal value using a control mapping, the control mapping being selected from a plurality of control mappings based on the output of step (d), the control signal value being generated based on the received tone value.

9. The method of claim 8, wherein the control mapping selects a control signal value from a group of two or more control signal values representative of two or more ink quantities.

10. The method of claim 9, wherein the group of two or more control signal values representative of two or more ink quantities is a non-sequential group of control signal values.

11. The method of claim 1, wherein the method further comprises:
   g. measuring the characteristics of a test printed output;
   h. generating a measured dot gain characteristic curve based on the measured characteristics; and
   i. calibrating one or more tone mappings and/or one or more control mappings so as to minimise the difference between the measured dot gain characteristic curve and a reference dot gain characteristic curve.

12. The method of claim 1, wherein the method further comprises configuring one or more tone mappings and/or one or more control mappings so as to limit the maximum quantity of ink emitted from the drop emitting device.

13. The method of claim 1, wherein the tone mapping is calibrated so as to vary the dot percentage range for a plurality of tone values.

14. A system for producing a printed output upon a substrate the system comprising:
   a drop emitting device for emitting a plurality of ink quantities in response to a control signal;
   an image receiver for receiving image data corresponding to a pixel of an image to be printed, the received image data comprising a tone value;
   a threshold generator for producing a threshold value for use in a screening operation;
   a mapping generator for generating a mapped tone value based on one of a plurality of tone mappings, each tone mapping operating on the received tone value;
   a comparator for performing a screening operation, wherein the comparator is adapted to compare the mapped tone value with the threshold value; and
   a controller for processing the comparator output and generating a control signal value based on one of a plurality of control mappings, each control mapping operating on the received tone value,
   wherein:
   if the output of the comparator indicates a first relationship, the controller is adapted to select one of the plurality of control mappings to generate control signal value;
   if the output of the comparator indicates a second relationship the controller is further adapted to instruct the mapping generator to produce a mapping tone value using an alternate one of the plurality of tone mappings and to select an alternate one of the plurality of control mappings with which to generate the control signal value.

15. The system of claim 14, wherein:
the mapping generator comprises a first two-dimensional mapping array for providing a mapped tone value based on the received tone value and an iteration counter;
the threshold generator comprises a second two-dimensional threshold array for providing a threshold value based on the location of the pixel within the image to be printed;
the controller comprises a third two-dimensional control array for generating a control signal value based on the received tone value and the iteration counter; and
the controller is further adapted to perform the following steps in response to receiving a tone value:
i. generating a threshold value using the second two-dimensional threshold array;
ii. resetting the iteration counter;
iii. generating a mapped tone value using the first two dimensional mapping array; and
iv. generating an output using the comparator,
wherein, if the output of the comparison indicates a first relationship, the controller is adapted to generate a control signal value using the third two-dimensional control array, and, if the output of the comparison indicates a second relationship, the controller is adapted to increment the iteration counter and repeat steps (iii) and (iv).

16. The system of claim 14, wherein the comparator is further adapted to generate a binary output based on the comparison of each mapped tone value and the threshold value.

17. The system of claim 14, wherein:
the mapping generator comprises a first two dimensional mapping array for providing a plurality of mapped tone values based on the received tone value and an ink quantity index;
the threshold generator comprises a second two-dimensional threshold array for providing a threshold value based on the location of the pixel within the image to be printed;
the comparator is adapted to produce a plurality of outputs based on a comparison of a plurality of mapped tone values and the threshold value; and
the controller comprises a third two dimensional control array for generating a control signal value based on the received tone value and the ink quantity index,
wherein the controller is further adapted to perform the following steps in response to receiving a tone value:
i. generating a threshold value using the second two-dimensional threshold array;
iii. generating a plurality of mapped tone values using the first two dimensional mapping array and a range of ink quantity indices; and iv. generating a plurality of outputs using the comparator, wherein the controller is adapted to select an ink quality index based on the plurality of outputs and to generate a control signal value using the third two dimensional control array and the selected ink quality index.

18. The system of claim 15, wherein the size of each the first and third two-dimensional arrays in one dimension is determined by the maximum number of ink quantities that can be emitted by the drop emitting device.

19. The system of claim 14, wherein a control mapping selects the control signal value from a group of two or more control signal values representative of two or more ink quantities.

20. The system of claim 19, wherein the group of two or more control signal values representative of two or more ink quantities is a non-sequential group.

21. The system of claim 14, wherein the drop emitting device is adapted to output zero or more of drops of ink when emitting a given quantity of ink.

22. The system of claim 14, wherein the system further comprises:
a sensor for measuring a printed output upon a substrate, the printed output comprising a test pattern; and
a calibration module for calibrating one or more tone mappings and/or one or more control mappings based on one or more measurements received from the sensor.

23. The system of claim 22, wherein the calibration module is adapted to generate a measured dot gain characteristic curve based on the one or more measurements received from the sensor and to calibrate the one or more tone mappings and/or one or more control mappings based on a comparison of the measured dot gain characteristic curve and a reference dot gain characteristic curve.

24. The system of claim 14, wherein the screening system is adapted to configure one or more tone mappings and/or one or more control mappings so as to limit the maximum quantity of ink emitted from the drop emitting device.

25. The system of claim 24, wherein the screening system is adapted to configure the one or more tone mappings and/or one or more control mappings based on the type of substrate to be printed upon.

26. The system of claim 14, wherein the mapping generator is calibrated so as to vary the dot percentage range for a plurality of tone values.

27. A colour printing apparatus for producing a colour printed output on a substrate, the printing apparatus comprising:
a plurality of systems according to claim 14, wherein each system is adapted to produce a printed output of a different colour component on the substrate.

* * * * *